Aug. 19, 1924.
E. D. HENDRICKSON
POULTRY SPRAYING APPARATUS
Filed Feb. 14, 1922
1,505,641
2 Sheets—Sheet 1
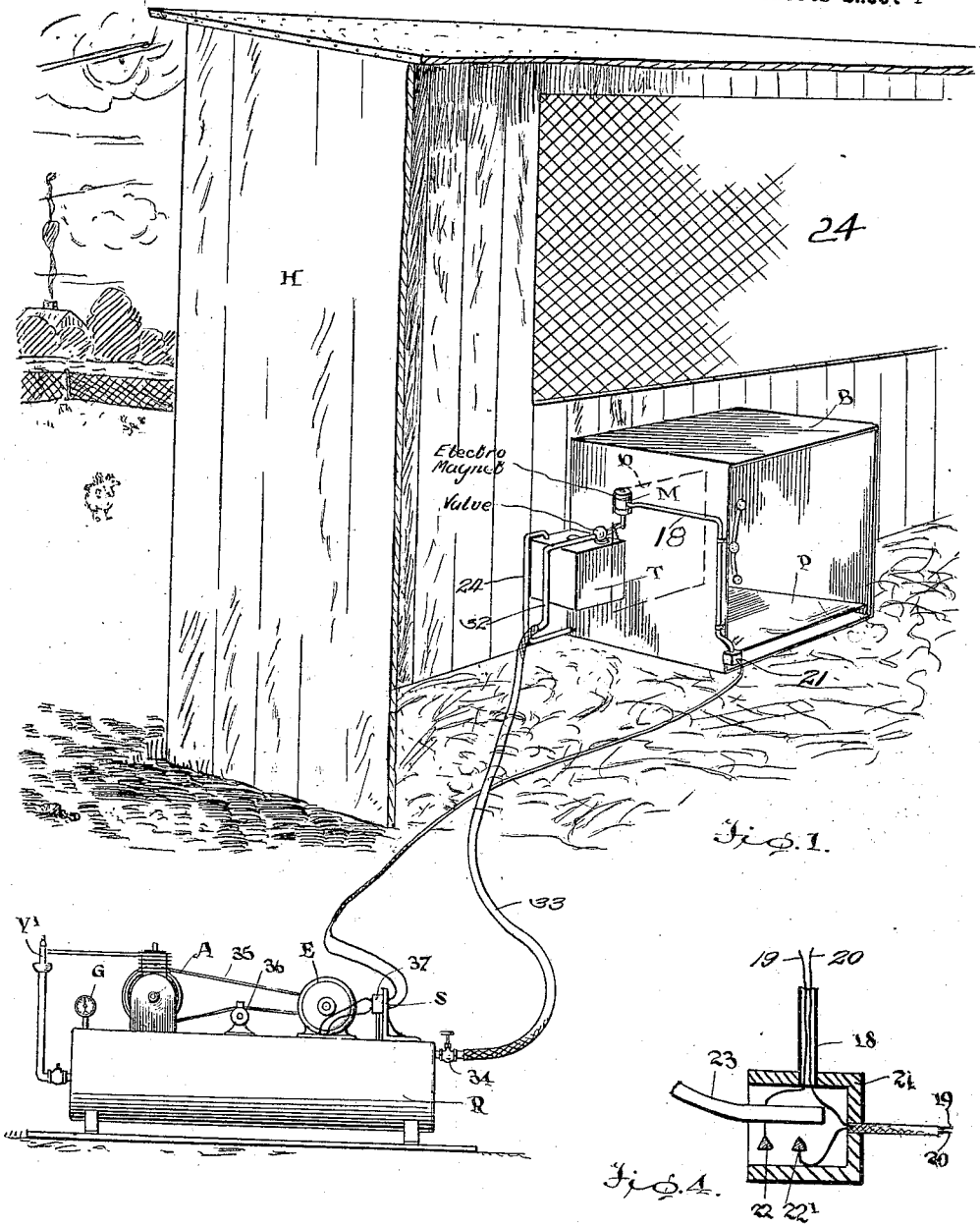
WITNESSES
R. J. Rousseau
INVENTOR
E. D. Hendrickson,
BY
ATTORNEYS Aug. 19, 1924.
E. D. HENDRICKSON
1,505,641
POULTRY SPRAYING APPARATUS
Filed Feb. 14, 1922    2 Sheets-Sheet 2
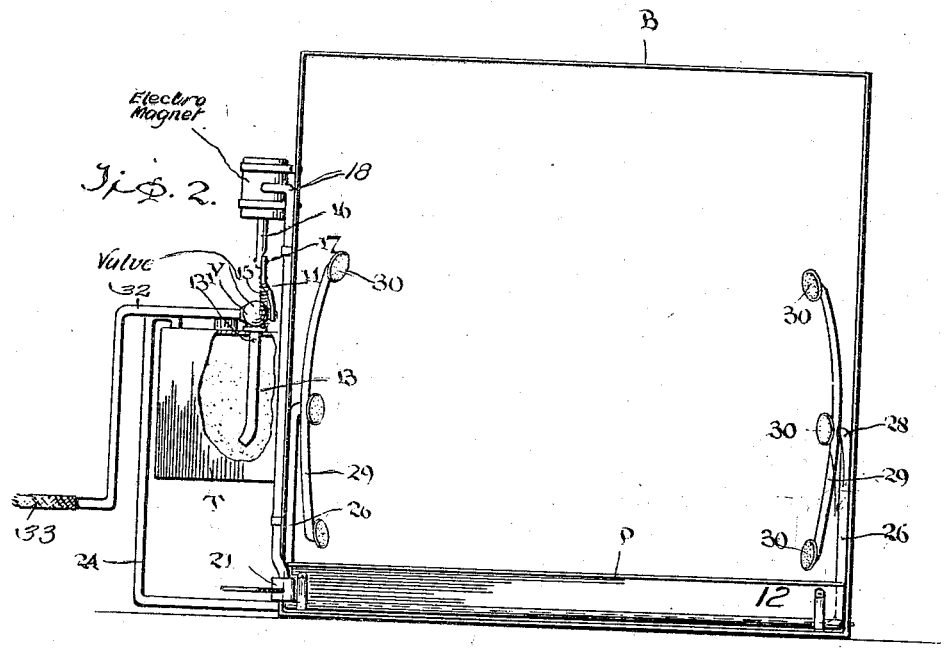
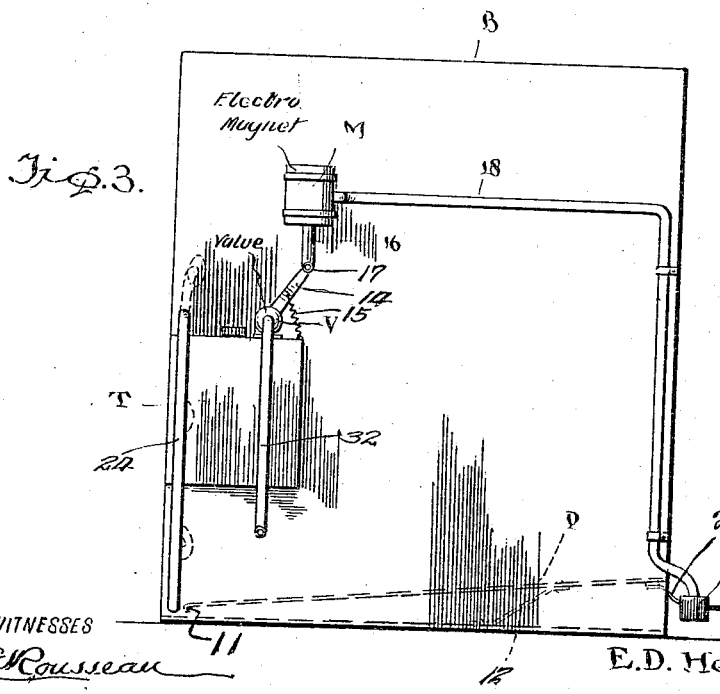
WITNESSES
J. E. Rousseau
INVENTOR
E. D. Hendrickson,
BY
ATTORNEYS Patented Aug. 19, 1924.

1,505,641

UNITED STATES PATENT OFFICE.

ELWOOD DAYTON HENDRICKSON, OF SEATTLE, WASHINGTON.

POULTRY-SPRAYING APPARATUS.

Application filed February 14, 1922. Serial No. 536,557.

*To all whom it may concern:*

Be it known that I, ELWOOD D. HENDRICKSON, a citizen of the United States, and a resident of Seattle, in the county of King and State of Washington, have invented certain new and useful Improvements in Poultry-Spraying Apparatus, of which the following is a specification.

This invention relates to a poultry spraying apparatus.

In the poultry industry in order to promote the healthful conditions of the poultry it is desirable to treat the same for exterminating lice or other harmful insects. This is usually carried out by spraying the poultry with a liquid or powder serving to carry a poison effective against lice or the like.

With the above in view it is the object of the present invention to provide an apparatus whereby poultry may be sprayed with a liquid or powder for destroying lice or the like in a highly efficient manner.

It is also an object of the invention that the apparatus be adapted to be associated with a poultry house in such a manner that during the entrance or exit of poultry from the house the same will be efficiently sprayed in an automatic manner and without any attention or care on the part of an attendant.

It is also an object of the invention that the spraying apparatus be extremely simple in construction and not subject to getting out of order.

Other objects and objects relating to details of construction, combination and arrangement of parts will hereinafter appear in the detailed description to follow.

Figure 1 is an enlarged perspective view illustrating the application of the invention, Figure 2 is a rear elevation of the spraying apparatus when fully assembled, Figure 3 is a side elevation of the same, and Figure 4 is a detailed view illustrating the electrical connections for the electro-magnet.

Referring to the drawing more particularly, H indicates generally a poultry housing, the rear wall of which has been broken away in order to show in elevation an inside side wall thereof, in which wall there is an entrance or runway for poultry to go into and out of said housing.

In carrying out the present invention, I provide a box B which is open at each of its ends which may be of any desirable shape and dimension and having two opposing walls removed so that poultry may pass through the box. The box B should be positioned within the poultry housing so that one of its open walls is in register with the entrance to the chicken house as at 10, Figure 1. To the bottom of the box B there is hinged as at 11 a platform P, and near the inner end of the platform there is positioned beneath the same a spring finger 12 which is adapted to yieldingly uphold the same in an inclined position as best illustrated in Figure 3.

The spring 12 should be adapted so that when a fowl such as a chicken or the like comes upon the platform the same will be depressed.

Also there is provided a tank T which is secured to one side wall of the box B which has projecting therein a pipe 13, said pipe terminating at its lower end adjacent the lower end of the tank T, as shown in Figure 2 of the drawings, and communicating at its upper end with a valve V. The pipe 13 communicates with the interior of the tank T through its lower end and also through the opening 13' adjacent its upper end, the purpose of which will be later explained. The valve V may be of any suitable known type of construction and having an operating handle 14 adapted to be moved for opening and closing said valve. Connected with the operating handle 14 is a coil spring 15 adapted to normally hold the valve handle so that the valve V is closed with respect to the pipe 13. Mounted upon the same side wall of the box B is an electro-magnet M which has a plunger 16 associated therewith, said plunger being pivotally connected at its lower end as at 17 to the valve operating handle 14. The magnet M should be of such construction that when the same is energized it will move the plunger 16 upwardly for operating the valve V, that is, opening the valve V with respect to the pipe 13.

Extending from the magnet M is a suitable conduit as at 18 through which there passes electric current supply wires 19 and 20 for said magnet. At 21 there is provided a junction box in which the wire 19 is divided and provided with a pair of contact points 22 and 22' which are adapted to be engaged and electrically connected by a finger 23 carried at the inner end of the platform P, when said finger is lowered to a predetermined position by the weight of a fowl upon the platform P. The wires 19 and 20 are further extended to a suitable source of electric current supply which will later be referred to.

Extending from the tank T is a pipe 24 which communicates with the two upright pipe portions 26, one pipe portion 26 being positioned adjacent each side of the platform P adjacent the front end of box and extending upwardly through a suitable recess in the platform, whereby said platform may have tilting movement without interfering with the pipes 26. The upper end of each pipe 26 terminates in an inwardly turned portion 28 which in turn communicates with an arcuate pipe portion 29, said arcuate pipe portion 29, in each instance, being arranged in a substantially vertical plane, as shown, and each being provided with a plurality of spray nozzles 30. Preferably each pipe carries a spray nozzle 30 at each end thereof and also a spray nozzle is positioned centrally with respect to the end nozzles. It is to be understood that any number of nozzles 30 may be used depending upon requirements and conditions. The nozzles 30 point inwardly with respect to the poultry house H.

Communicating with the valve V is a pipe 32 which in turn is connected at its other end to a hose or the like 33, said hose communicating at its opposite end with the tank with a compressed air reservoir R through the valve 34. The purpose of the air reservoir R is to supply compressed air to the tank T at a certain pressure. Any suitable means may be utilized for supplying the reservoir R with compressed air at a predetermined value. In the present instance, I have shown an air compressor A which is driven by an electric motor E by the means of a belt 35. A belt tightening means 36 may also be employed. The air reservoir R may also have a gauge G and a release valve V'. For supplying the motor E with electric current a suitable switch board may be used as at S, which may be supplied from any desirable source or electric current and which may carry a switch 37 adapted to be operated to drive the motor E at the required intervals for maintaining the pressure within the reservoir R at a predetermined degree. Also the switch board S may be utilized for supplying the wires 19 and 20 for operating the electro-magnet M by extending a suitable cable or wires as shown from the switch board S to connect with the wires 19 and 20, Figure 1.

In the operation of the present apparatus, the tank T is filled with a liquid poison or a powder poison for destroying poultry lice, and then the switch board S is properly connected with an electric source of supply. The box B is arranged, as shown in Figure 1. When the fowl enters the door or runway 10 and steps upon the platform P, the inner end of said platform tilts downwardly against the tension spring 12 and causes the contact finger 23 to establish an electric circuit to the electro-magnet M. The electro-magnet M upon being energized lifts the plunger 16 and opens the valve V. Upon opening the valve V compressed air is permitted to enter the tank T through pipe 13. Air passes from the pipe 13 through its lower end and opening 13'. If the tank T has powder therein, the air entering from the lower end of tank lifts the powder and the air entering from the opening 13' forces it to pass through the pipe 24 and to the nozzles 30. By this arrangement the powder is kept in circulation and has no chance to clog or pack. If liquid poison is used the air entering through the opening 13' of pipe 13 atomizes the liquid forced from the tank and causes a fine spray to issue from the nozzles 30. Also it may be mentioned that the arcuate shaped pipe portion 29 should be so arranged that the spray issuing from the nozzles 30 will be directed inwardly with relation to the poultry house. By this arrangement, the spray strikes the fowl at the rear and efficiently sprays beneath the feathers thereof. Upon the fowl passing off the platform P the platform returns to its original position, as shown in the different Figures, and the circuit through the electro-magnet M is opened and the valve V closed with relation to the pipe 13.

It may be here mentioned that by experiment it has been found that with an apparatus of the character heretofore described, the operation for spraying a fowl will be carried on in a noiseless manner and with the result that the fowl being treated is at no time scared and they will pass through the box B without hesitancy.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. In an apparatus of the character described, a pair of opposing spray nozzles, one being disposed upon each side wall of a passageway, a tiltable platform forming the bottom or floor of said passageway, a pair of contact members disposed beneath the platform, a bridging member for said contacts carried by the platform and adapted to connect the same when said platform is tilted in a predetermined direction, an electrical circuit adapted to be closed with the connecting of said contacts, and means connected with said electrical circuit adapted to force a liquid through said nozzles when said circuit is closed.

2. In an apparatus of the character described, a tiltable platform, a pair of spray nozzles one positioned upon each side of the platform and opposing each other, a liquid tank communicating with each spray nozzle, a valve controlled pipe connected to a source of compressed air supply and extending into said tank, the free end of said pipe being open and in close spaced relation with the bottom of the tank, and the upper end of the pipe having an opening to further establish communication with the interior of the tank and thereby to atomize liquid within the tank when compressed air is admitted to the tank through said pipe, and electrical means whereby upon the platform being tilted the valve-controlled pipe will be open to permit compressed air to enter said liquid tank and thereby to atomize said liquid and force the same in an atomized state through said spray nozzles.

ELWOOD DAYTON HENDRICKSON.